(No Model.)
E. F. & G. A. BARNES.
PIPE TONGS OR WRENCH.
No. 307,163. Patented Oct. 28, 1884.
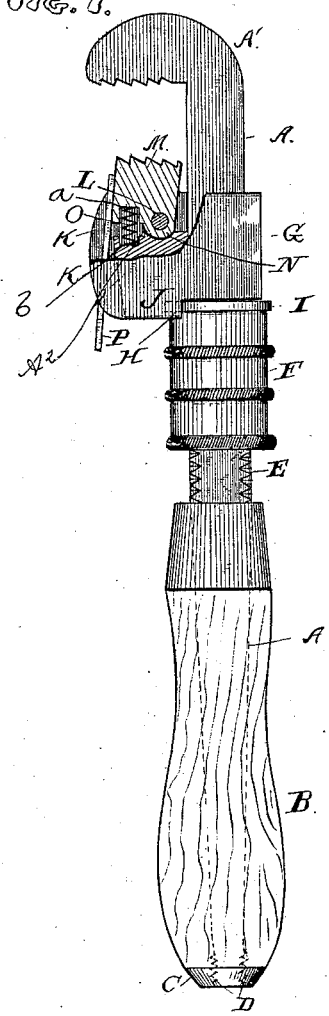
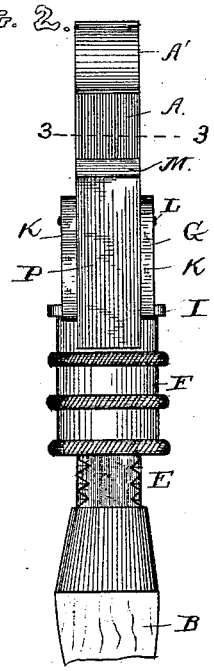
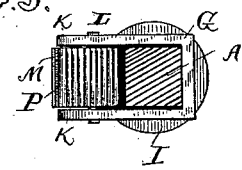
Witnesses:
E. P. Hough
C. E. Jones
Inventors
Elbridge F. Barnes
George A. Barnes
By A. O'Neill
and Chas. J. Gooch
their Attorneys

UNITED STATES PATENT OFFICE.

ELBRIDGE F. BARNES AND GEORGE A. BARNES, OF NEW HAVEN, CONN.

PIPE TONGS OR WRENCH.

SPECIFICATION forming part of Letters Patent No. 307,163, dated October 28, 1884.

Application filed February 4, 1884. (No model.)

*To all whom it may concern:*

Be it known that we, ELBRIDGE F. BARNES and GEORGE A. BARNES, citizens of the United States, residing at New Haven, in the county of New Haven and State of Connecticut, have invented certain new and useful Improvements in Pipe Tongs and Wrenches, of which the following is a specification, reference being had therein to the accompanying drawings.

This invention relates to that class of pipe tongs and wrenches having an adjustable lower jaw or slide; and the invention consists, essentially, in providing said adjustable jaw with a pivoted and spring-held block or dog having a round or semicircular bearing which works within a concaved recess in the sliding jaw, and means for operating the same, whereby the tongs or wrench is adapted to firmly grip pipes and other articles however varied their shapes and whatever may be the inequality of the surface of the article to be held.

In the drawings, Figure 1 is a side elevation, partly in section, of our improved tool. Fig. 2 is a front elevation thereof. Fig. 3 is a horizontal section on the line 3 3 of Fig. 2.

The main or rigid portion of the tool consists of stem A, having at its upper end a downwardly-curved jaw, A', having a horizontally-extending serrated under face. The lower end of the stem is passed through a hollow handle, B, and is secured therein by means of a nut, C, which engages with the screw-threaded lower end, D, of said stem.

E represents a screw-thread formed in the stem a suitable portion of its length, and along which the screw-nut F travels as it is turned from left to right as it is desired to raise or lower the sliding jaw G. The jaw G has an inwardly-extending lug or flange, H, with which a circumferential flange, I, on the upper end of the screw-nut F engages, in order that as said nut F is raised or lowered it will carry with it said sliding jaw G. The jaw G has a horizontal slotted extension, J, between the jaws K K of which is pivoted at L a dog or block, M, having a serrated upper face and a round or semicircular or knuckle-shaped bearing, N, working within a concaved recess, A², in the horizontal extension of the jaw G.

O represents a spiral or other spring having bearing at its ends in sockets or recesses $a$ and $b$, formed in the under face of the pivotal dog M and the horizontal extension of the slide G, respectively; and P represents a lug or arm extending downwardly from the outer face of the pivotal dog M below the slide G, and by means of which said pivotal dog is operated.

When it is desired to grip or clamp a pipe, tube, or other article, the operative presses inward upon the lower end of the lug or arm P, which act will draw the pivotal dog M forward to a straight horizontal position and compress the spring O within its sockets. The tool is then placed in position to grasp the pipe or other article, the nut F is then turned to force the slide G and pivotal dog M upward into clamping position, and then the inward pressure upon the arm or lug P is released, whereupon the compression upon the spring O being released said spring will expand and force upward and inward upon its pivot said dog M into gripping contact with the article between the serrated faces of the rigid upper jaw, A', and the pivotal dog M. By this arrangement a dual gripping-pressure is obtained upon the pipe or other article—namely, that resulting from the clamping operation of the screw F and that resulting from the power of the spring O.

When the article to be gripped is of irregular shape or has surface inequalities, this device is especially useful, as, by reason of the automatic adjustability of the pivotal dog M, said dog will adapt itself to any angularity or inequality of the surface, and thus hold the article more securely than would be done by a jaw capable simply of vertical adjustment.

By forming the rigid jaw A' with a straight horizontal serrated under face we are enabled to grip pipes of different sizes and shapes with greater facility and security than would be the case were such face formed at any angle, or were it formed straight but without serrations. It is therefore better adapted for a variety of uses than those wrenches where the under face is unprovided with serrations or where the under face is of angular form.

By forming the under face of the pivotal dog and the upper face of the vertically-sliding block or lower jaw with a socket the spiral spring will always be held securely vertically in operative position and protected from injury and displacement, and the power of the spring will always, while in operation, exert a steady upward pressure upon the clamping-dog in addition to forcing it inward. Where springs are connected with the clamping-dog, or with the devices for oscillating the same, so as to operate in a horizontal direction solely, this upward pressure against the dog is absent, and where a portion of the spring is exposed, or one portion thereof is unprovided with a retaining-socket or equivalent holding device, it is liable to get out of operative position, and thus render its operation defective. These objections are overcome by providing sockets within the dog and vertically-sliding jaw, as thereby the spring is securely held in position at all times and is protected from injury or interference and from contact with dirt and dust.

Having thus described our invention, what we claim is—

1. A pipe-wrench having a fixed jaw, a sliding block constructed substantially as shown and described, a pivotal jaw mounted in the said block and provided with a thumb-piece, and a spiral spring interposed, as shown, between the upper face of the seat and the sliding block and the lower face of the pivotal jaw and entirely inclosed and protected by the said parts, substantially as set forth.

2. A pipe-wrench having a fixed jaw, a sliding block constructed substantially as shown and described, a pivotal jaw mounted in the said block and provided with a thumb-piece, and a spiral spring interposed between the upper face of the seat of the said block and the lower face of the pivotal jaw and having its ends entered into sockets formed in the said face of the jaw and seat, substantially as set forth.

3. A pipe-wrench having a fixed jaw, a sliding block constructed substantially as shown and described, a pivotal jaw mounted in the said block and provided with a knuckle having bearing on the wall of a recess formed in the upper face of the seat of the block, and a spiral spring interposed, as shown and described, between the said upper face of the seat of the sliding block and the lower face of the pivotal jaw, substantially as set forth.

In testimony whereof we affix our signatures in presence of two witnesses.

ELBRIDGE F. BARNES.
GEORGE A. BARNES.

Witnesses:
H. W. SMITH,
FRED M. BARTLETT.